UNITED STATES PATENT OFFICE.

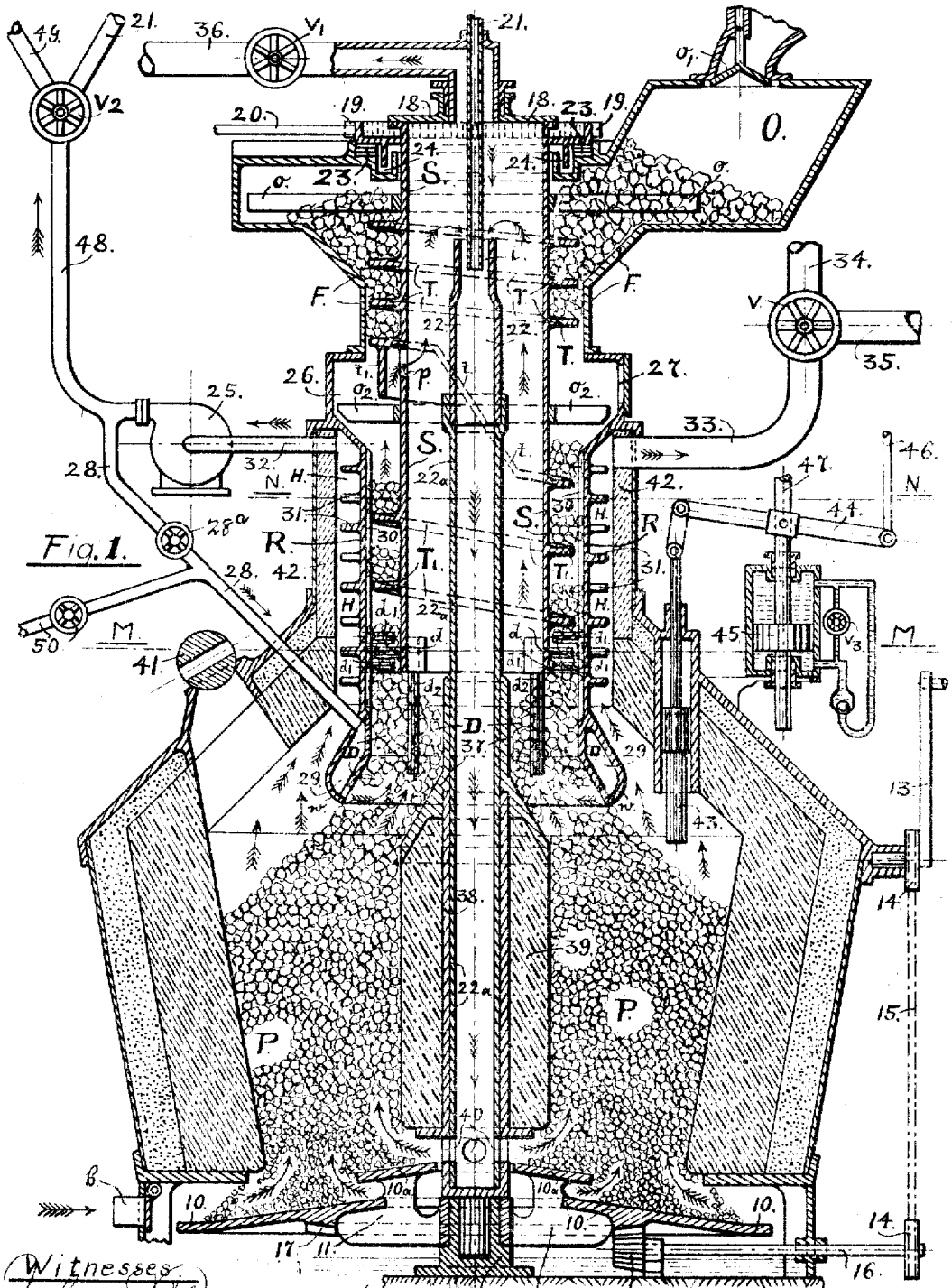

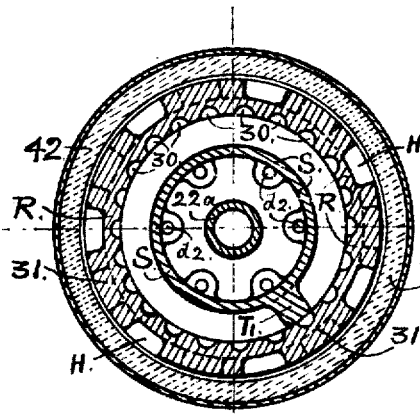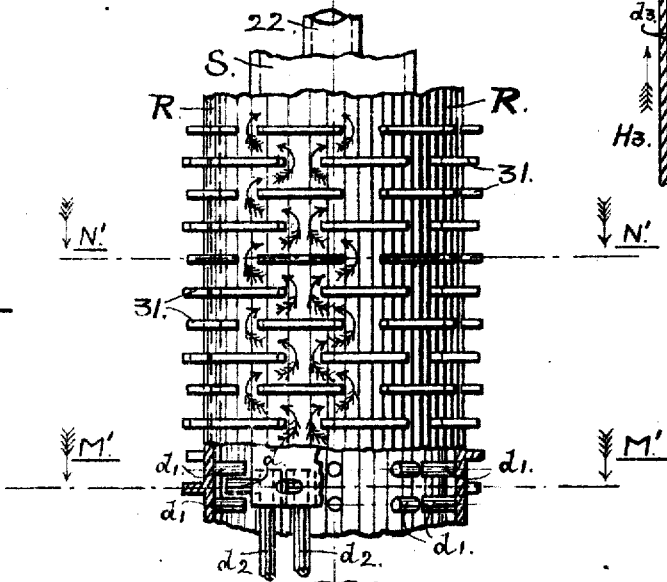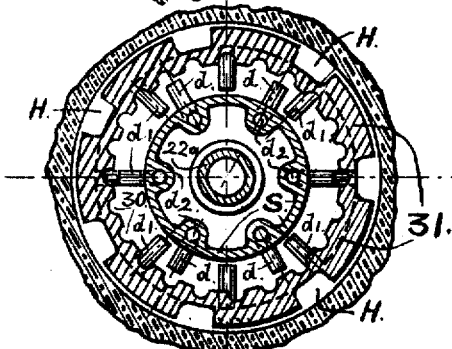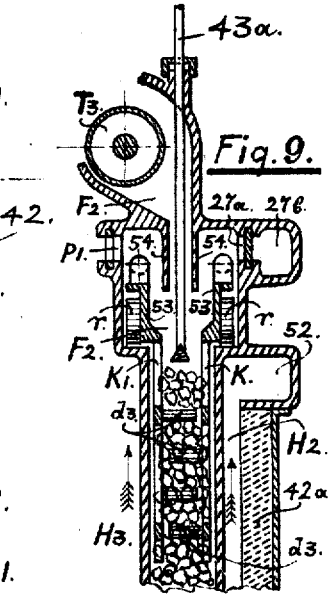

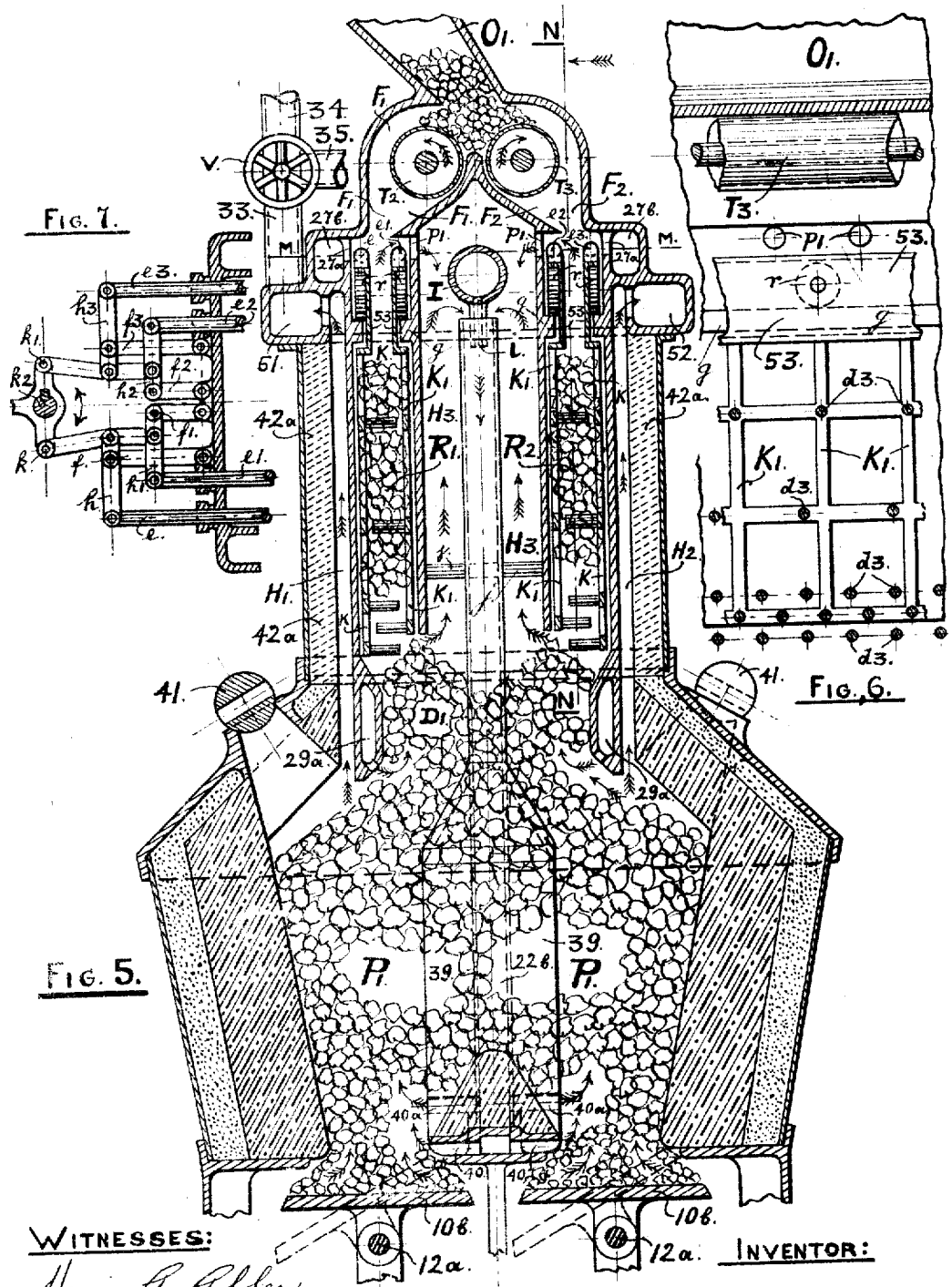

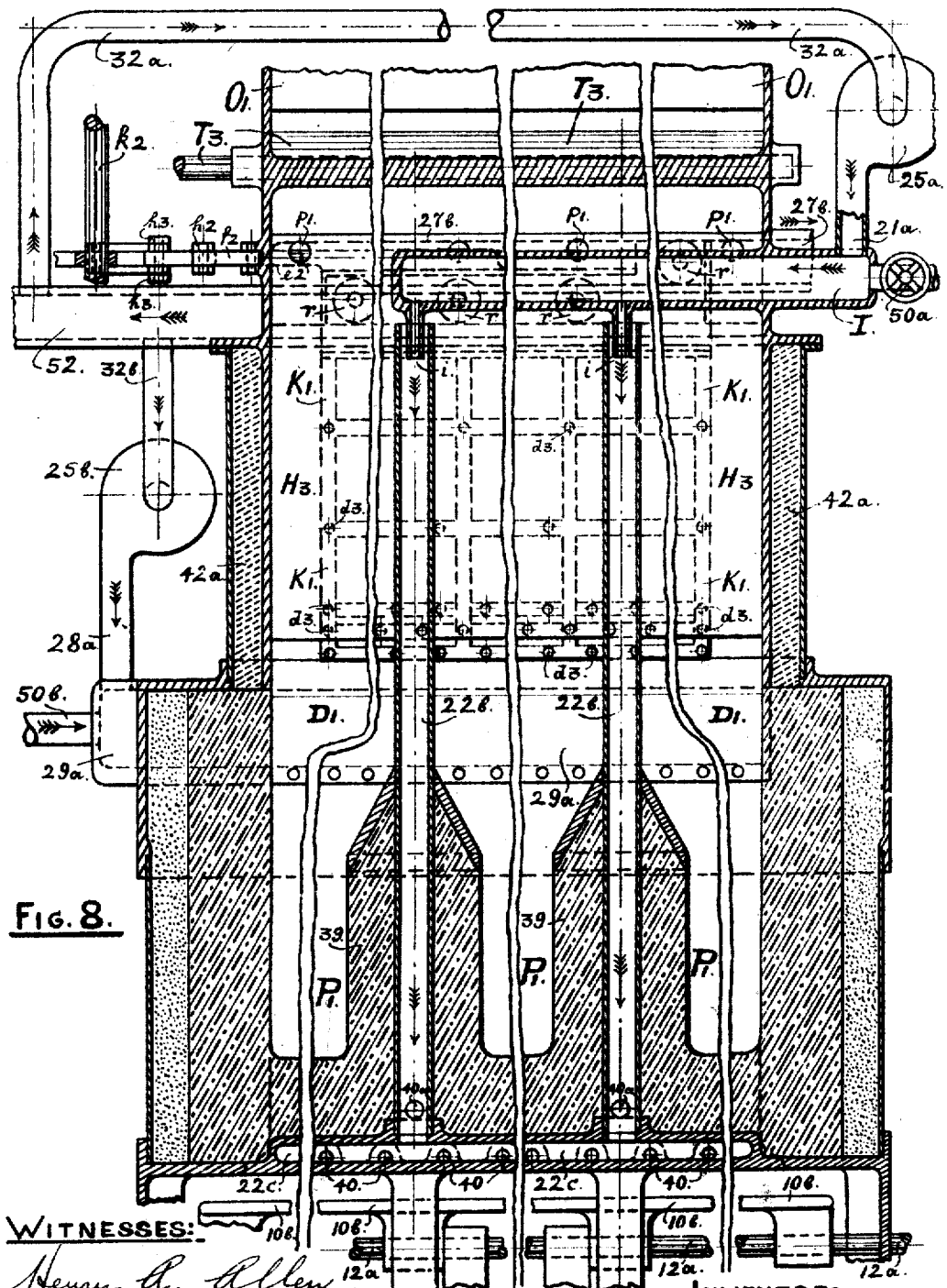

HENNING FRIEDRICH WALLMANN, OF CHICAGO, ILLINOIS.

APPARATUS FOR GENERATING GAS.

1,177,584.   Specification of Letters Patent.   Patented Mar. 28, 1916.

Application filed December 14, 1910. Serial No. 597,363.

*To all whom it may concern:*

Be it known that I, HENNING FRIEDRICH WALLMANN, a citizen of the United States of America, residing at Chicago, in the county of Cook and State of Illinois, have invented a new, useful, and Improved Apparatus for Generating Gas, of which the following is a description, reference being had to the accompanying drawings, forming a part of this specification, in which similar letters and numerals of reference in the several figures indicate similar parts.

My invention relates to apparatus for generating gas from hydro-carbonaceous substances, preferably from coking, bituminous coal, and more particularly to processes and apparatus by which hydro-carbonaceous fuel is gasified in three stages, namely, first, by primarily and imperfectly distilling solid fuel by conduction and convection of heat through the walls of a retort, preferably of heat, derived from hot, gaseous products generated in the third stage of the gasifying process; second, by secondarily and perfectly distilling the residue of primary distillation by leading a gaseous heating and distilling agent, preferably hot gaseous products generated in the third stage of the gasifying process through the residue of primary distillation; and third, by oxidizing remaining carbor or coke by a supply of free oxygen to preferably carbon-monoxid and by preferably utilizing a part of the generated heat for converting condensable distillates evaporated by the said primary and secondary distillations into permanent gases, and for preferably disassociating steam into its elements, hydrogen and oxygen, the latter becoming associated with carbon to preferably carbon-monoxid; and the objects of my improvements are, first, to facilitate and accelerate the said primary distillation by surrounding a comparatively very narrow retort on opposite sides by two heat-conducting walls, preferably by an outer and an inner wall or by outer and inner walls each partly inclosing one of two or one of several heating chambers, preferably one partly inclosing an inner and the other an outer or one of two outer heating chambers, said inner heating chamber being fully or partly surrounded by a retort of annular shape in a horizontal cross-section or by two or by several retorts preferably of oblong shape in a horizontal cross-section and located on opposite sides of the said inner heating chamber; second, to preferably provide mechanical means adapted to be continuously in operation for supplying said fuel from a magazine into the said retort or retorts; third, to automatically regulate the fuel-supply from the said magazine into the said retort or retorts in such a way as to maintain open spaces and passage-ways for distillates free of solid fuel between the body of fuel in the said magazine and that in each of the said retorts; fourth, to connect each of the said open spaces and passage-ways to a suitable discharge-canal for distillates, preferably past the said inner heating chamber, and to thus provide an upper outlet or upper outlets for distillates from the upper part of the said retort or retorts; fifth, to preferably provide mechanical means for continuously agitating and promoting the heated and, as a result of heating, pasty mass of partly molten and liquefied coking bituminous coal during its presence within and for its discharge from the said retort or retorts; sixth, to provide suitable mechanical means for breaking and crushing the resulting partly coked, hard and brittle residue of primary distillation; seventh to provide a lower outlet or lower outlets for distillates from the lower part of the said retort or retorts, and to connect the same to a discharge canal for distillates, preferably past the said inner heating chamber; eighth, to secondarily and perfectly distil residue of primary distillation within a chamber suitable for this purpose by a passage therethrough of a hot, gaseous fluid or distilling agent, preferably consisting of producer-gas generated by a partial combustion of residue of this secondary distillation, or consisting of a mixture of said producer-gas with superheated steam; ninth, to connect the chamber for secondary distillation to a discharge-canal for a mixture of said distilling agent and of the evaporated distillates, preferably past the said inner heating chamber and to a canal used also for discharging distillates evaporated in the said retort or retorts; tenth, to provide the combustion chamber or producer - shaft employed for gasifying residue of secondary distillation with a vertical conduit or with vertical conduits in its center part for the discharge of distillates into the lower part of the fuel bed therein; eleventh, to connect the said conduit or conduits, preferably past the said inner heating chamber, to the said chamber for secondary distillation or to one or to each of the said outlets for distillates from the said retort or retorts, or as well to the said chamber for secondary distillation as to one or to each of the said outlets for distillates from the said retort or retorts; twelfth, to preferably provide means for ejecting the gaseous contents of the said inner heating chamber past the said vertical conduit or conduits into the lower part of the fuel-bed within the said producer-shaft and to preferably employ steam or compressed producer-gas or a mixture of both under pressure as an ejecting agent; thirteenth, to provide in the lower end of the wall partly or fully surrounding the said chamber for secondary distillation a jacket or conduit for a cooling agent not containing a substantial quantity of free oxygen, but preferably consisting of steam or producer-gas of moderate temperature or of a mixture of both for cooling that part of the said wall mostly exposed to the heat of the hot gaseous products employed as distilling agent; fourteenth, to provide proper means for leading said cooling agent into said jacket; fifteenth, to preferably provide means controllable at will for separately withdrawing: distillates from the said retort or retorts, a mixture of distilling agent or agents and distillates from the said chamber for secondary distillation, and producer-gas from the said producer-shaft; sixteenth, to preferably provide means for sucking air and preferably a mixture of said ejecting agent, said distilling agent, said cooling agent, and distillates through incandescent fuel within the said producer-shaft, for sucking a part of the resulting permanent gas through the said outer heating chamber or chambers, and for sucking another part of the resulting permanent gas through residue of primary distillation within the said chamber for secondary distillation and preferably through the said inner heating chamber; seventeenth, to preferably combine a part of these suction-means with the above said means for supplying ejecting and cooling agents for thereby creating a closed circuit of a gas-current maintaining a constant quality of gas in the gas-space of the apparatus at times when no gas is temporarily withdrawn for the purpose of its regular manufacture; and eighteenth, to provide new and improved mechanical means for fuel-feeding, for maintaining open passage-ways for the discharge of distillates, for promoting and agitating the fuel during its presence within and for its removal out of the retort or retorts, for breaking and crushing the partly coked fuel, for removing ashes from the lower end of the producer-shaft, and for automatically regulating these mechanical functions in accordance with the amount of gas simultaneously required for the purpose of its manufacture. I attain these objects by the apparatus illustrated in the accompanying drawings, in which—

Figure 1 is a vertical section through the center line of the main-parts of a gas-producer circular in horizontal cross-section. Fig. 2 is a horizontal section at the line N—N of Fig. 1. Fig. 3 is a side-view of a part of the retort R of Fig. 1. Fig. 4 is a horizontal section at the line M—M of Fig. 1. Fig. 5 is a vertical cross-section through the main parts of a gas-producer, oblong in its plan. Fig. 6 is a vertical longitudinal section through a part of an oblong retort, at the line N—N of Fig. 5. Fig. 7 is a horizontal section at the line M—M of Fig. 5 and illustrating a part of a mechanical agitator. Fig. 8 is a vertical longitudinal section through the center line of Fig. 5, and Fig. 9 is a vertical cross-section through the modified construction of an oblong retort, broken off.

I shall first describe the construction of the apparatus illustrated in Figs. 1 to 4: P is a producer-shaft, circular in plan, fireproof lined, provided with an air-inlet $b$, and preferably water-sealed at its base as is usual in gas-producers. The fuel-bed is supported by plates 10 and $10^a$ carried by arms 11 with which said plates may be revolved about a center-column 12 by means of a crank 13, sprocket-wheels 14, 14, chain 15, shaft and pinion 16, and bevel-gear wheel 17. Above the producer-shaft P is located the chamber D for secondary distillation, being surrounded partly or fully by the lower part of a retort wall R, the upper part of which partly incloses a retort below a magazine for fuel O. The lower part of the retort wall R is integral with a wall $w$ inclosing an annular cooling chamber 29 surrounding the lower-part of the chamber for secondary distillation D and communicating therewith through perforations in the lower end of the wall $w$. A pipe 28 may deliver a cooling agent into the chamber 29 and through said perforations through the wall $w$ into the chamber D, as is indicated by arrows. The retort R surrounds a hollow screw-spindle S supporting two screw-threads, an upper screw-thread T of smaller pitch and a lower screw-thread $T^1$ of coarser pitch. These two screw-threads are connected to each other by means of a steep flange or a steep part of a screw-thread $t$ having a pitch sufficiently coarse for allowing the dropping of fuel from the lower end of the upper screw-thread T directly down to the upper part of the lower screw-thread T¹, and at the same time for preventing together with a shield $t^1$, the entrance of solid fuel into the discharge-hole for distillates $p$.

$o^1$ is a valve or port for admitting solid fuel from a hopper into the magazine O. $o, o$ are catch-arms for moving fuel from the latter toward the upper screw-propeller T. Roller bearings 23 support the rotary spindle S, the interior of which is separated from the atmosphere by means of a water-seal 24, together with a cover 18. A ratchet pawl 20 may impart rotary motion to the ratchet-gear 19 and to the hollow spindle S with its screw-threads. A stationary discharge-pipe for gaseous distillates 22 is located in the center of the hollow spindle and is connected to a downward extension $22^a$ extending down to the lower part of the producer-shaft P and communicating therewith through holes 40 preferably located above the plates $10^a$. The pipes $22^a$ and 22 are supported by the center-column 12, and the lower part of the extension-pipe $22^a$ is protected by the pipe 38, fire-brick 39 and cap or shield-pipe 37 from being damaged by the moving incandescent coke within the producer-shaft P and within the chamber for secondary distillation D. Connected to the lower part of the magazine O and surrounding the screw-thread T, is a fuel-feeding casing F connected by means of the inclosure 26 forming an annular recess to the upper part of the retort-wall R. Said recess is preferably provided with two outlets $p$ and 27 for distillates, the former being shown open for leading distillates from the retort into the interior of the hollow spindle S with the outlet 27 being shown closed by a suitable cover. In the case however that it is desired to utilize at an outside locality a part or all of the distillates evaporating into the recess 26, said cover may be removed for connecting the outlet 27 by means of a suitable discharge-pipe for distillates to said outside locality; and the outlet $p$ may then eventually be closed. Also a hole like 27 may in any case be provided with a cover of transparent material and may be used for inspection. Catch arms $o, o$, remove solid fuel from the recess 26 toward the lower screw-propeller T¹ and into the retort R. A heating chamber H, partly inclosed by the annular wall 42, preferably consisting of non-heat-conducting material, surrounds the retort R, into the lower part of which project from the retort wall, stationary short studs $d^1$ and from the spindle S short studs $d$ for breaking between them the partly coked, hard and brittle fuel. Rods $d^2$ suitably fastened to the lower end of the hollow spindle S extend into the chamber D for secondary distillation and promote the fuel therein toward the producer-shaft P. Grooves 30 with ribs between them on the inside surface of the retort-wall R prevent or impede a rotation of fuel with the revolving screw-propeller T¹.

A gas discharge pipe 33 may lead generated gas from the heating chamber H past the three-way valve V either through the pipe 34 toward a chimney and the atmosphere or through a pipe 35 toward a scrubber and toward other apparatus or machines provided with suction means for utilizing the generated gas as is usual in suction-gas-producers. A combined exhauster and blower 25 may suck gas from the heating chamber H through the gas-discharge-pipe 32 and deliver the gas preferably with the valve $28^a$ open through two pipes 28 and 48 into the jacket or chamber 29 and also past the three-way valve V² either through a pipe 49 toward a chimney and the atmosphere or through the pipe 21 toward an ejector $i$ for ejecting gaseous contents from the interior of the hollow spindle S through the tubes 22, $22^a$ and holes 40 into the lower part of the producer shaft P.

A pipe 36 may be provided for leading gaseous contents from the interior of the hollow spindle S past the valve V¹ to any suitable outside location and in case that all the gaseous fluid accumulating in the interior of the hollow spindle S is thus withdrawn to an outside location, the pipes 21, 22, $22^a$, 38, shield pipe or cap 37 and fire-brick column 39 may be dispensed with. A pipe and valve 50 may be provided for leading steam from any suitable source of steam through the lower part of the pipe 28 with the valve $28^a$ preferably closed, into the cooling jacket or chamber 29, and in the case that only steam is thus employed as cooling agent and that the gaseous fluid accumulating in the interior of the hollow spindle S is withdrawn to an outside location, the fan or blower 25 may be dispensed with.

Instead of providing a cooling jacket or chamber 29 in the inclosure of the chamber for secondary distillation D, said inclosure may consist of fire-proof or refractory material or may be protected by a surrounding mantle of fire-proof material, in which case all means for supplying a cooling agent may be dispensed with.

On the outside of the retort-wall R and integral therewith are preferably provided flanges or projections 31 arranged in such a way that the generated gas issuing from the producer-shaft P and flowing toward the gas-discharge pipes 32 and 33 impinges against said flanges 31 and imparts the greatest part of its perceptible heat to the same and thereby to the fuel within the retort R.

41 is a perforated ball provided for introducing a poker-rod into the producer-shaft P as is usual in gas-producers.

43 is a mechanical feeler connected to a double lever 44 pivotally connected to a piston 45 of a hydraulic cataract and to a connecting-rod 46 in operative connection with a suitable source of motion. This contrivance is provided for the purpose of automatically regulating the fuel-supply into the distillation-chamber and into the producer-shaft P and for maintaining in the latter a substantially constant height of the fuel-bed. The prolongation of the piston-rod 47 is connected in some operative way to the ratchet-pawl 20 and disengages the same from the ratchet-gear 19 as soon as the piston 45 rises over its normal position. The details of this contrivance are not parts of the present invention, but it may be explained that the connecting-rod 46, the double lever 44 and the mechanical feeler 43 slowly reciprocate in a vertical plane, the piston 45 being in its normal position as long as the mechanical feeler 43 does not strike the fuel-bed within the producer-shaft P at the end of its downward movement. Whenever the fuel-bed by too quick fuel-feeding rises so high as to impede the down-stroke of the mechanical feeler 43, the piston 45 is raised by the upward motion of the connecting-rod 46, and in consequence the rising piston-rod 47 stops by suitable mechanical connections the rotation of the screw-propellers T and T¹ and of the attachments connected thereto.

The apparatus and process operate as follows: After the pipe 33 is connected to the pipe 34 and to a chimney, a fire is kindled in the producer-shaft P and coke or anthracite coal gradually supplied by means of the screw-propellers T and T¹ until the fuel-bed has attained its normal height in the producer-shaft P, the chamber D and in the lower part of the retort R. The draft of air through the fuel-bed may be further promoted by connecting the combined exhauster and blower 25 by means of the three-way-valve V² and through the pipes 48 and 49 to a chimney, and by connecting the apparatus to a source of motion thereby starting the operation of said exhauster 25 which, with the valve 28ª preferably closed, creates a partial vacuum in the heating chamber H and on top of the fuel-bed in the producer shaft P and thereby sucks air and eventually other gaseous fluid into the lower part of the said fuel-bed. As soon as the latter has become sufficiently hot, a cooling agent may be admitted into the cooling-jacket 29 by either opening the valve 28ª with the valve 50 closed or by opening the valve 50 and by admitting steam through same from any suitable source with the valve 28ª either closed or more or less open.

In each case the combined exhauster and blower 25 may be connected by means of the valve V² and the pipe 21 to the ejector $i$ and thereby caused to eject gaseous contents from the hollow spindle S and to thus create therein a partial vacuum causing in turn a flow of the cooling agent admitted to the jacket 29, i. e. either steam from the open valve 50 or gas from the open valve 28ª or a mixture of both fluids from both said valves, through the fuel in the chamber D toward the hollow spindle S and the ejector $i$, from where the resulting mixture of the ejecting agent from the blower 25 and the cooling agent from the jacket 29 flows through the tubes 22 and 22ª and holes 40 into the lower part of the fuel-bed within the producer-shaft P. With the introduction of steam into the jacket 29, semi-water gas will now be generated and the pipe 33 may be connected by means of the valve V and the pipe 35 to a gas engine, boiler or other apparatus for consuming or storing the generated gas. At the same time, bituminous coal or other hydro-carbonaceous fuel or substances may be supplied into the magazine O from where catch-arms $o$, $o$ and the screw-conveyer T deliver the fuel past the annular recess 26 into the helical canal partly inclosed by the screw-conveyer T¹. The bituminous coal being heated within said helical canal, fuses into a pasty mass and expands but does not fully occupy the helical space between the screw-thread T¹, leaving cavities for the discharge of the generated distillates toward the annular recess 26 from where the same may be discharged either through the opening 27 or through the hole $p$ and in the latter case either, into the ejector $i$ or into the pipe 36. After a certain part of the hydro-carbonaceous constituents of bituminous coal is distilled within the screw-conveyer T¹, the residue thereof becomes a hard, solid and porous mass, which after being crushed by the studs $d$ and $d^1$ is secondarily and perfectly distilled and converted into coke by the hot current of a distilling agent consisting either of hot gas only or of a mixture of superheated steam and gas issuing from the steam-jacket 29 and from the fuel-bed within the producer-shaft P respectively, said current penetrating said crushed, porous mass and distilling the remainder of hydro-carbons contained therein. The resulting gaseous mixture consisting of producer-gas and distillates with or without steam is withdrawn through the hollow spindle S and may be discharged, either in conjunction with or without the generated distillates from the annular recess 26, either through the pipe 36 toward any suitable location and apparatus for separating by-products, such as ammonia, tar, creosote, etc., therefrom or for its consumption or storage; or said resulting mixture may in conjunction with or without generated distillates from the annular recess 26, be discharged by the ejector $i$ through the pipes 22, $22^a$ and through the holes 40 into the lower part of the fuel-bed within the producer shaft P from where said gaseous mixture rises through the incandescent portion thereof, partly toward the chamber D and partly toward the heating chamber H and the gas-discharge pipes 32 and 33, whereby all the condensable distillates and steam contained in said gaseous mixture are converted into permanent gases by the well known chemical process in combining with air entering through the air-inlet $b$ and producing the required heat, by consuming the carbon contained in the residue emitted from the secondary distillation chamber D into the producer-shaft P. By revolving the crank 13 and thereby the rotary plates 10 and $10^a$ operatively connected thereto, the ashes and clinkers resulting from the combustion of coke within the producer-shaft P, may be removed therefrom and may be dropped into the water below, from where they may be removed in the way customary in the operation of gas producers.

Describing now the modified construction illustrated in Figs. 5, 6, 7, 8 and 9, $P^1$ is the producer-shaft, oblong in its plan and fire-proof line, the fuel-bed being supported by oblong plates $10^b$ adapted to oscillate about horizontal shafts or pivots $12^a$. Above the producer-shaft $P^1$ is located the chamber $D^1$ for secondary distillation, oblong in its plan and inclosed on its two opposite long sides by two oblong cooling conduits or chambers $29^a$ communicating through numerous perforations with the lower part of the chamber $D^1$. Above the latter are located two retorts $R^1$ and $R^2$, oblong in their plan between two heating chambers $H^1$ and $H^2$ and on opposite sides of the heating chamber $H^3$. All of the said three heating chambers $H^1$, $H^2$, and $H^3$ are oblong in their plan, and the outside heating chambers $H^1$ and $H^2$ are preferably protected against loss of heat by non-conductors of heat $42^a$. A magazine $O^1$ oblong in its plan is located above the said two retorts $R^1$ and $R^2$ and connected by chambers $F^1$ and $F^2$ respectively to the upper part thereof. Two rollers or drums $T^2$ and $T^3$ are adapted to effect and to regulate the delivery of fuel from the magazine $O^1$ into the retorts $R^1$ and $R^2$, past the chambers $F^1$ and $F^2$ respectively. Distillates evaporated in the upper part of the retorts $R^1$ and $R^2$ may enter into the chambers $F^1$ and $F^2$ and from there either through holes $p^1$ into the heating chamber $H^3$ or through holes $27^a$ into canals $27^b$ from where they may be carried to any suitable point of destination.

Gas may enter from the heating chambers $H^1$ and $H^2$ into canals 51 and 52, and from there a part of the gas may be sucked by the exhauster $25^a$ through the pipe $32^a$ and may be delivered through pipes $21^a$ and I into a plurality of ejectors $i$, through pipes $22^b$ into a horizontal canal $22^c$ and past the holes 40 or $40^a$ into the lower part of the producer-shaft $P^1$ thereby ejecting gaseous contents from the heating chamber $H^3$ into the incandescent fuel-bed within the producer-shaft $P^1$. In the case that steam from any suitable source is employed as ejecting agent, the same may enter through a pipe and valve $50^a$ into the pipe I. The latter or the pipe $21^a$ may be connected in any suitable manner to the cooling chambers $29^a$ for leading a cooling agent consisting of gas or of steam or of a mixture of both therein. Or a second exhauster $25^b$ may be employed for delivering gas from the canals 51 and 52 through pipe $32^b$ and $28^a$ into the cooling chambers $29^a$. Also a second steam-supply-pipe $50^b$ may be provided for leading a cooling agent into said cooling chambers or conduits $29^a$.

For agitating the fuel within the retorts $R^1$ and $R^2$ and for gradually promoting the fuel into the chamber $D^1$ for secondary distillation and for breaking and crushing the fuel before its entrance into the chamber $D^1$, two respectively and reciprocally movable frames K and $K^1$ are provided in each retort $R^1$ and $R^2$. These frames K and $K^1$ are supported by rollers $r$, $r$ and either by horizontal guide bars $g$, $g$ rigidly fastened to or integral with the long walls of the said oblong retorts on the inside thereof, or said rollers $r$, $r$ may in turn be supported by offsets of the long walls of the said oblong retorts on the inside thereof as is indicated in Fig. 9. The top of the frames K and $K^1$ may be provided with plates 53 for protecting the rollers $r$, $r$ and the guide-bars $g$, $g$ or the said guide offsets from fuel falling into the retorts, and guard-plates 54 may be provided for the same purpose as indicated in Fig. 9. Each of the frames K and $K^1$ is provided with studs $d^3$, the studs of one frame being located relatively to the studs of the other frame so as not to prevent the motion of the two frames, but sufficiently near to each other as to be adapted for breaking, crushing and agitating the fuel between them with the frames K and $K^1$ reciprocating in opposite directions. To each frame K and $K^1$ is connected one of the rods $c$, $c^1$, $c^2$ and $c^3$ each of which in turn is connected to one of the levers $h$, $h^1$, $h^2$ and $h^3$, each being pivotally connected to the end of one of the links $f$, $f^1$, $f^2$ and $f^3$ and also properly connected to one of the two arms $k$ and $k^1$ of the oscillating vertical shaft $k^2$.

The walls inclosing the retorts $R^1$ and $R^2$ may be reinforced by stay-bolts $j$ or in any known, suitable way. These walls may also be provided with projections like or similar to the projections 31 shown in Figs. 1, 2, 3 and 4 and for the same purpose. The retorts R¹ and R² may also be provided with reciprocating pushers or mechanical feelers 43ᵃ as shown in Fig. 9 for automatically regulating the motion of the fuel-feeding, fuel-agitating and ash-removing mechanical devices. Instead of providing the cooling chamber 29ᵃ in the cast-iron inclosure of the chamber D¹ for secondary distillation, said inclosure may be made of fire-proof material in which case said cooling chamber can be dispensed with.

The apparatus operates in the same or in a similar way as described with reference to the apparatus illustrated in Figs. 1, 2, 3 and 4 with the motion of the mechanical devices modified according to their modified shape and character and according to the specific shape of the gas-producer with its retorts, as will be understood by any mechanic.

The leading principle of my process and the two apparatus illustrated for generating gas, may be shortly described as follows: Producer-gas is naturally hot right after it has been generated, and would cause pre-ignition if mixed in a hot state with air and then compressed as is usually done in gas-engines. It is therefore of advantage to utilize its perceptible heat by transferring the same to freshly supplied and often moist fuel for the distillation thereof. In order to accomplish this transference of heat as quickly as possible, the vessel for doing so is made narrow and of well heat-conducting material, preferably of metal, which however is liable to be destroyed by an excess of heat and is therefore not adapted to transfer as high a temperature as is required for a perfect distillation of most kinds of fuel to be gasified. For this reason the imperfectly distilled fuel is removed into another space or vessel through which a heating agent of sufficiently high temperature is led, preferably by suction. The volatile ingredients of the partly coked and in most cases porous residue of primary distillation are then quickly and completely evaporated by coming into immediate contact with the said heating agent.

In the case that the fuel consists of bituminous coking coal, the same fuses into a body of pasty mass when heated, thereby greatly impeding or preventing a passage of gaseous fluid through the whole or through part of its body toward a certain predetermined direction or location. If the said pasty mass occupies a vertical conduit or retort with upper fuel inlet and lower coke-outlet as is usual in gas-producers, it is practically almost impossible to discharge all of the generated distillates in either a horizontal or vertical direction through a single outlet, because the distillates generated near one extremity of the body of pasty mass are practically prevented from penetrating this body toward the opposite extremity thereof. In order to be able to discharge under such conditions distillates toward a certain predetermined direction or locality, I either provide mechanical means adapted to keep open a passageway for distillates free of solid fuel through such pasty mass, as is shown in Fig. 1, or I provide the retort with two outlets for distillates, one near the fuel-inlet into and the other near the coke-outlet out of the said retort for separately discharging distillates generated at and issuing from opposite ends of the said body of pasty mass, as shown in Figs. 1 and 5. At the same time I provide mechanical means for gradually promoting the fuel through said retort or retorts, and for preventing a sticking, arching, and wedging of the fuel under distillation therein; which mechanical means are naturally of so much greater importance, the narrower the retort is made and the quicker accordingly the process of distillation proceeds.

By accelerating the motion of the coke through the combustion chamber P or P¹ and by reducing the amount of air supplied thereto, coke instead of ashes and clinkers may be discharged therefrom and the amount of coke thus produced may be increased by a reduction of the amount of hot gas required for distillation, which reduction can be made by leading a sufficient amount of air into the heating chambers H, H¹ and H² for completely consuming the amount of gas delivered thereinto and for thus generating a sufficient amount of heat for distilling the fuel by means of a greatly reduced amount of gas.

In the case that it is desirable to generate a gas not containing a substantial quantity of nitrogen, pure oxygen or a mixture of oxygen and steam may be used instead of air for partly consuming the coke delivered into the combustion chamber P or P¹, and the resulting gas or a part of it may be employed as distilling agent within the chamber for secondary distillation D or D¹, whereas another part thereof or gas from some other suitable source may be used as heating agent in the heating chambers H, H¹ and H².

In the claims the word "outside" is used with reference to the retorts or distillation conduits R, R¹ and R², and to the walls thereof. It will be understood that inasmuch as the retort R is annular or ring-shaped in a horizontal cross-section, the word "outside" is intended to include any location surrounded by the ring-shaped retort R and by its inner wall, viz. the hollow spindle S.

In the claims reference is made to an oblong retort to oblong retorts, to an oblong chamber for secondary distillation, to an oblong heating conduit or chamber or to a plurality of such oblong conduits or chambers. It will be understood that the words "oblong" and "parallel" in the claims have always the meaning of "oblong in plan or in horizontal cross-section" or of "parallel in plan or in a horizontal cross-section," respectively.

I wish to claim:

1. In a gas producer, a combustion chamber, a distillation conduit for distilling fuel and located in operative proximity to said chamber, two separate heating conduits each located at the opposite side of a wall of and with respect to said distillation conduit and each constructed to discharge separately from the other one thereof gaseous products of combustion from said chamber into contact with said wall, and a perforated wall constructed to allow a communication between said distillation conduit and one of said two heating conduits.

2. In a gas-producer, two distillation-conduits at a distance from each other, a gas-chamber between and partly inclosed by two inside parts of walls of the said two conduits, an inlet for distillates from the latter into and a gas outlet out of said gas chamber, and two heating chambers partly inclosed by two outside parts of walls of the said two conduits, each of the said two outside parts of walls being adapted to transfer heat from the contents of one of the said two heating chambers to fuel within the appertaining distillation conduit.

3. In a gas-producer, two distillation-conduits at a distance from each other, a gas-chamber between and partly inclosed by two inside parts of walls of the said two conduits, an inlet for distillates from the latter into and a gas outlet out of said gas chamber, a chamber for secondary distillation at the lower end of the said gas-chamber and of the said two conduits, two heating chambers partly inclosed by two outside parts of walls of the said two conduits, each of the said two outside parts of walls being adapted to transfer heat from the contents of one of the said two heating chambers to fuel within the appertaining distillation conduit, and a producer-shaft in communication with said chamber for secondary distillation.

4. In an apparatus for distilling fuel, a distillation conduit for simultaneously conveying and distilling fuel, a heating chamber in operative proximity and lateral to said conduit, a source of combustible communicating with said heating chamber, an air supply for consuming said combustible, a fluid-chamber for a fluid not containing a consequential quantity of free oxygen, and lateral to said conduit, a heat conducting wall constructed to be in contact with gaseous products of combustion within said heating chamber and with said fluid in said fluid chamber, a supply of said fluid into said fluid-chamber, a perforated wall constructed to supply fluid from said fluid-chamber into fuel under conveyance within said conduit, an outlet for residue of distillation and a second separate outlet for a mixture of said fluid and distillates from said conduit, and mechanical means for withdrawing said mixture from said second outlet.

5. In a gas producer, a distillation conduit for distilling fuel, a heating chamber in operative proximity and lateral to said conduit, a source of combustible communicating with said heating chamber, an air supply for consuming said combustible, a steam chamber, in operative proximity and lateral to said conduit, a steam supply into said steam chamber, and a heat conducting, perforated wall constructed to be in contact with fuel within said conduit, with gaseous products of combustion within said heating chamber and with steam in said steam chamber for superheating said steam and for supplying the super-heated steam into said conduit.

6. In an apparatus for distilling fuel, a distillation conduit for simultaneously conveying and distilling fuel, a heating chamber, a fluid-chamber for a fluid not containing a consequential amount of free oxygen, a perforated side wall of said conduit and constructed to be in contact with fuel therein and located between said conduit and said two chambers, a source of combustible communicating with said heating chamber, an air supply for consuming said combustible, an inlet for said fluid into said fluid-chamber and communicating through the latter and through said perforated wall with said conduit, an outlet for gaseous products of combustion from said heating chamber, and a discharge canal for distillates from said conduit.

7. In a gas producer, a combustion chamber for consuming residue of distillation, a distillation conduit for distilling fuel and located anterior to said chamber for supplying residue of distillation thereinto, a chamber for distillates located at the opposite side of a side wall of and with respect to said conduit, an outlet for distillates from said conduit into said chamber for distillates, a canal surrounded by said chamber for distillates and leading into the fuel-bed within said combustion chamber, an inlet for distillates into the upper part of said canal within said chamber for distillates, and an outlet for distillates out of the lower part of said canal within said fuel-bed.

8. In an apparatus for distilling fuel, a receptacle for fuel, a distillation conduit below said receptacle for distilling fuel and for simultaneously conveying fuel from said receptacle in downward direction toward a receptacle for solid residue of distillation, means for heating fuel within said conduit, means for agitating fuel in substantially horizontal directions within said conduit, and an outlet for distillates from said conduit and located intermediate between the two said receptacles.

9. In an apparatus for distilling fuel, a plurality of oblong distillation conduits substantially parallel to each other and provided each one with two opposite short and two opposite long side walls and each one constructed to distil fuel and to simultaneously convey the same toward a receptacle for residue of distillation, means for heating the fuel conveyed in each one of said conduits, and a plurality of outlets for distillates through each one of said two opposite long side walls of each of said conduits.

10. In an apparatus for distilling fuel, a plurality of oblong distillation conduits substantially parallel to each other and provided each one with two opposite short and two opposite long side walls and each one constructed to distil fuel and to simultaneously convey the same toward a receptacle for residue of distillation, a plurality of oblong heating chambers substantially parallel to each other and to said conduits, the side walls of each one of said conduits being partly integral with the inclosures of a plurality of said chambers, an inlet for a heating agent into each one of said chambers, and a plurality of outlets for distillates through each one of said two opposite long side walls of each one of said conduits.

11. In an apparatus for distilling fuel, a distillation conduit for simultaneously conveying and primarily distilling fuel, means for heating fuel in said conduit, a chamber for secondary distillation below said conduit and communicating therewith, an outlet for residue of primary distillation from said conduit toward said chamber, a separate outlet for distillates from said conduit, means for breaking residue of primary distillation near the lower end of said conduit, a source of hot gaseous products of combustion, a source of steam, means for mixing hot gaseous products from one with steam from the other of said sources, and means for leading resulting mixture through broken residue of primary distillation within said chamber.

12. In an apparatus for distilling fuel, a distillation conduit for simultaneously conveying and primarily distilling fuel, means for heating fuel in said conduit, a chamber for secondary distillation below said conduit and communicating therewith, an outlet for residue of primary distillation from said conduit toward said chamber, a separate outlet for distillates from said conduit, means for breaking residue of primary distillation near the lower end of said conduit, an outlet for solid combustible and a separate outlet for distillates from said chamber, a source of hot combustible gas located exterior of said chamber, a source of steam, means for mixing hot gas from one with steam from the other of said sources, a canal partly located on the opposite side of a sidewall of and with respect to the lower part of said conduit, and means for leading resulting mixture through broken residue of primary distillation within said chamber toward said canal.

13. In an apparatus for distilling fuel, a plurality of oblong distillation conduits substantially parallel to each other and provided each one with two opposite short and two opposite long side walls and each one constructed to distil fuel and to simultaneously convey the same in a downward direction toward a receptacle for residue of distillation, means for heating fuel conveyed in each one of said conduits, means for agitating fuel in substantially horizontal directions within each one of said conduits, and a plurality of outlets for distillates through each one of said two opposite long sidewalls of each one of said conduits.

14. In an apparatus for distilling fuel, a distillation conduit for simultaneously conveying and primarily distilling fuel, means for heating fuel in said conduit, a chamber for secondary distillation below said conduit and communicating therewith, an outlet for residue of primary distillation from said conduit toward said chamber, a separate outlet for distillates from said conduit, an outlet for solid combustible and a separate outlet for distillates from said chamber, a source of hot combustible gas located exterior of said chamber, a steam supply, means for leading steam from said steam supply past hot surfaces toward said chamber and for thereby superheating steam, means for mixing hot gas from said source with resulting superheated steam, a canal partly located on the opposite side of a sidewall of and with respect to the lower part of said conduit, and means for leading resulting mixture through residue of primary distillation within said chamber toward said canal.

15. In an apparatus for distilling fuel, a plurality of oblong distillation conduits for simultaneously conveying and primarily distilling fuel, means for heating fuel in each of said conduits, a chamber for secondary distillation below and communicating with each of said conduits, an outlet for residue of primary distillation provided for each of said conduits and leading toward said chamber, a separate outlet for distillates provided for each of said conduits, a source of hot gaseous products of combustion, a source of fluid not containing a consequential quantity of free oxygen, means for mixing hot gaseous products from one with fluid from the other of said sources, and means for leading resulting mixture through residue of primary distillation within said chamber.

16. In an apparatus for distilling fuel, a plurality of oblong distillation conduits for simultaneously conveying and primarily distilling fuel, means for heating fuel in each of said conduits, a chamber for secondary distillation below and communicating with each of said conduits, an outlet for residue of primary distillation provided for each of said conduits and leading toward said chamber, a separate outlet for distillates provided for each of said conduits, a source of hot combustible gas, a source of steam, means for mixing hot gas from one with steam from the other of said sources, and means for leading resulting mixture through residue of primary distillation within said chamber and toward locations in proximity to but exterior with respect to the lower parts of said conduits.

17. In an apparatus for distilling fuel, a receptacle for green fuel, a plurality of oblong distillation conduits for simultaneously conveying and distilling fuel, mechanical means for supplying fuel from said receptacle into each one of said conduits, means for heating and distilling fuel in each one of said conduits, a perforated long side wall of each one of said oblong conduits, and each one of said oblong conduits communicating through said perforated long side wall with a substantially horizontal canal constructed for the passage of gaseous fluid.

18. In an apparatus for distilling fuel, a source of fuel, a plurality of oblong distillation conduits for simultaneously conveying and distilling fuel, fuel distributing means above said conduits for supplying fuel from said source into each one of said conduits, means for heating and distilling fuel in each one of said conduits, a plurality of canals below said fuel distributing means and each constructed for the passage of gaseous fluid, a perforated long sidewall of each one of said oblong conduits, and each one of said conduits communicating through said perforated sidewall with one of said canals.

19. In an apparatus for distilling fuel, a source of fuel, a plurality of oblong distillation conduits for simultaneously conveying and primarily distilling fuel, fuel distributing means above said conduits for supplying fuel from said source into each one thereof, means for heating and distilling fuel in each one of said conduits, a plurality of canals below said fuel distributing means and each constructed for the passage of gaseous fluid, a perforated long sidewall of each one of said oblong conduits for effecting a communication between the appertaining conduit and one of said canals, a chamber for secondary distillation below said conduits and constructed to secondarily distil residue resulting from primary distillation in one of said conduits, a source of hot gaseous products of combustion, and means for leading said hot gaseous products from said source through residue of primary distillation within said chamber.

20. In an apparatus for distilling fuel, a source of fuel, a plurality of oblong distillation conduits for simultaneously conveying and distilling fuel, fuel distributing means above said conduits for supplying fuel from said source into each one of said conduits, means for heating and distilling fuel in each one of said conduits, an outlet for residue of distillation from the lower part of each one of said conduits, a plurality of substantially horizontal canals each constructed for the passage of gaseous fluid and each in communication with one of said conduits at points located below said fuel distributing means and above said outlet, and a long sidewall of each one of said oblong conduits and constructed to allow a communication between the appertaining conduit and one of said canals but to impede the entrance of solid fuel from said conduit into the appertaining one of said canals.

21. In an apparatus for distilling fuel, a receptacle for fuel, a plurality of distillation conduits below said receptacle and substantially parallel to each other and each oblong in a horizontal cross-section and constructed to distil fuel and to simultaneously convey fuel from said receptacle in downward direction toward a receptacle for solid residue of distillation, means for heating fuel within each of said conduits, means for agitating fuel in substantially horizontal directions within each of said conduits, and a plurality of substantially horizontal canals for the discharge of distillates and each communicating with one of said conduits at a location intermediate between the two said receptacles.

22. In an apparatus for distilling fuel, a plurality of oblong distillation conduits substantially parallel to each other and provided each one with two opposite short and two opposite long side walls and each one constructed to distil fuel and to convey the same in a downward direction toward a receptacle for residue of distillation, a plurality of oblong heating chambers substantially parallel to each other and to said conduits, the side walls of each one of said conduits being partly integral with the inclosures of a plurality of said chambers, an inlet for a heating agent into each one of said chambers, a plurality of outlets for distillates through each one of said two opposite long side walls of each one of said conduits, and means for agitating fuel in substantially horizontal directions within each one of said conduits.

23. In an apparatus for distilling fuel, a plurality of oblong distillation conduits substantially parallel to each other and provided each one with two opposite short and two opposite long sidewalls and each one constructed to distil fuel and to simultaneously convey the same toward a receptacle for residue of distillation, means for heating fuel conveyed within each one of said conduits, and a plurality of outlets for distillates through each one of said two opposite long sidewalls of one of said conduits.

24. In an apparatus for distilling fuel, a plurality of oblong distillation conduits substantially parallel to each other and provided each one with two opposite short and two opposite long sidewalls and each one constructed to primarily distil fuel and to convey the same toward a chamber for secondary distillation, means for heating the fuel conveyed in each one of said conduits, a plurality of outlets for distillates through one of said two opposite long side walls of each one of said conduits, two sources of fluid not containing a consequential quantity of free oxygen, but the fluid of one source different in chemical character from the fluid of the other source, means for leading fluids from said two sources through residue of primary distillation conveyed into said chamber, and an outlet for resulting mixture of fluids from said chamber.

25. In an apparatus for distilling fuel, a plurality of oblong distillation conduits substantially parallel to each other and provided each one with two opposite short and two opposite long sidewalls and each one constructed to primarily distil fuel and to convey the same in a downward direction toward a chamber for secondary distillation, means for heating fuel conveyed in each one of said conduits, a plurality of outlets for distillates through one of said two opposite long side walls of each one of said conduits, means for agitating fuel in substantially horizontal directions within each one of said conduits, a source of steam, a source of hot gaseous products of combustion, means for leading fluids from said two sources through residue of primary distillation conveyed into said chamber, and an outlet for resulting mixture of fluids from said chamber.

26. In an apparatus for fractionally distilling fuel, a plurality of distillation-zones partly of lower and partly of higher temperature with respect to each other, a receptacle for solid combustible, a distillation conduit constructed to convey a mass of fuel from a zone of lower temperature in consecutive order through said distillation-zones toward said receptacle, means provided for preventing an entrance of a consequential amount of air in its natural chemical character into fuel under conveyance through said distillation-zones, means for heating fuel under conveyance through said distillation-zones, and means for discharging separately out of each one of said distillation-zones resulting distillates.

27. In an apparatus for fractionally distilling fuel, a plurality of distillation-zones partly of lower and partly of higher temperature with respect to each other, a receptacle for solid combustible, a distillation conduit constructed to convey a mass of fuel from a zone of lower temperature in consecutive order through said distillation-zones toward said receptacle, means provided for preventing an entrance of a consequential amount of air in its natural chemical character into fuel under conveyance through said distillation-zones, means for leading a hot distilling fluid into fuel of said mass, and means for discharging separately out of each one of said distillation-zones resulting distillates.

28. In an apparatus for fractionally distilling fuel, a plurality of distillation-zones partly of lower and partly of higher temperature with respect to each other, a receptacle for solid combustible, a distillation conduit constructed to convey a mass of fuel from a zone of lower temperature in consecutive order through said distillation-zones toward said receptacle, means for preventing an entrance of a consequential amount of air in its natural chemical character into fuel under conveyance through said distillation-zones, a source of hot combustible gas, means for leading gas from said source through fuel of said mass, and means for discharging separately out of each one of said distillation-zones resulting distillates.

29. In an apparatus for distilling fuel, a distillation chamber, means for supplying solid fuel into and for discharging solid combustible out of said chamber, means for heating and for thereby distilling fuel within said chamber, means for withdrawing resulting distillates from said chamber, means for preventing an entrance of a consequential amount of air of natural chemical character into said chamber, a combustion chamber constructed to produce, while in operation, always substantially one and the same kind of gaseous products of combustion with respect to their chemical character, a canal constructed to supply products of combustion from said combustion chamber into said distillation chamber and located outside of the inclosure of each one of these two said chambers, and an aperture in the inclosure of each one of the two said chambers for connecting the interior of the latter to the interior of said canal.

30. In an apparatus for distilling fuel, a distillation chamber, means for supplying solid fuel into and for discharging combustible residue of distillation out of said chamber, means for heating and for thereby distilling fuel within said chamber, means for separating resulting distillates from resulting residue of distillation, means for preventing an entrance of a consequential amount of air of natural chemical character into said chamber, a combustion chamber constructed to produce while in operation, always substantially one and the same kind of gaseous products of combustion with respect to their chemical character, a canal located outside the inclosure of each one of the two said chambers, an aperture in the inclosure of each one of the two said chambers for connecting the interior of the latter to the interior of said canal, and means for supplying products of combustion from said combustion chamber through said canal into said residue within said distillation chamber after said distillates have been separated from said residue.

31. In an apparatus for distilling fuel, a distillation chamber, means for supplying solid fuel into and for discharging solid combustible out of said chamber, means for heating and for thereby distilling fuel within said chamber, means for separating resulting distillates from resulting residue of distillation, means for preventing an entrance of a consequential amount of air of natural chemical character into said chamber, a combustion chamber constructed to produce while in operation, always one and the same kind of gaseous products of combustion with respect to their chemical character, a canal located outside of the inclosure of each one of the two said chambers, an aperture in the inclosure of each one of the two said chambers for connecting the interior of the latter to the interior of said canal, means for supplying products of combustion from said combustion chamber through said canal into said residue after said distillates have been separated from the latter, and means for discharging separately from said distillates resulting gaseous products from said chamber.

32. In an apparatus for continuously distilling fuel, a distillation conduit, means provided to be continuously in operation for supplying solid fuel into an inlet of said conduit and for delivering this fuel through said conduit toward an outlet for combustible residue of distillation, means for preventing an entrance of a consequential amount of air of natural chemical character into said conduit, means for heating and for thereby distilling fuel within said conduit, a combustion chamber constructed to produce, while in operation, always substantially one and the same kind of gaseous products of combustion with respect to their chemical character, an inlet for fluid provided in a substantially upright side inclosure of said conduit, a canal located outside of and lateral to said side inclosure of said conduit and constructed to supply gaseous products from said combustion chamber through said inlet for fluid into fuel within said conduit, an outlet for distillates from said conduit, and means for discharging distillates from said outlet.

33. In an apparatus for continuously distilling fuel, a distillation conduit, means provided to be continuously in operation for supplying solid fuel into an inlet of said conduit and for delivering this fuel through said conduit toward an outlet for combustible residue of distillation, means provided to prevent an entrance of a consequential amount of air of natural chemical character into said conduit, means for heating and for thereby distilling fuel within said conduit, a combustion chamber constructed to produce, while in operation, always substantially one and the same kind of gaseous products of combustion with respect to their chemical character, a plurality of inlets provided in a substantially upright side inclosure of said conduit, means provided to supply gaseous products from said combustion chamber through each one of said inlets into fuel within said conduit, a plurality of outlets for distillates from said conduit, and means for discharging distillates from each one of said outlets.

34. In an apparatus for distilling fuel, a distillation chamber, means for supplying solid fuel into and for discharging solid combustible out of said chamber, means for heating and for thereby distilling fuel within said chamber, means for discharging resulting distillates from said chamber, means provided to prevent an entrance of a consequential amount of air of natural chemical character into said chamber, a combustion chamber constructed to produce, while in operation, always substantially one and the same kind of gaseous products of combustion with respect to their chemical character, two canals located outside of the inclosure of each one of the two said chambers, one of said canals communicating with the interior of each one of said chambers for supplying products of combustion from said combustion chamber into said distillation chamber, and the other of said two canals provided for supplying into said distillation chamber a quantity of fluid of a temperature different from the temperature of said products of combustion.

35. In an apparatus for distilling fuel, a distillation chamber, means for supplying solid fuel into and for discharging solid combustible out of said chamber, means for preventing an entrance of a consequential amount of air of natural chemical character into said chamber, a combustion chamber constructed to produce, while in operation, always substantially one and the same kind of gaseous products of combustion with respect to their chemical character, means for withdrawing gaseous products from said combustion chamber and for increasing the pressure of the withdrawn gaseous products and for delivering the withdrawn gaseous products under increased pressure into fuel within said chamber, and means for discharging resulting fluid from said chamber.

36. In an apparatus for continuously distilling fuel, a distillation conduit, means provided to be continuously in operation for supplying solid fuel into an inlet of said conduit and for delivering this fuel through said conduit toward an outlet for combustible residue of distillation, means provided to prevent an entrance of a consequential amount of air of natural chemical character into said conduit, a combustion chamber constructed to produce, while in operation, always substantially one and the same kind of gaseous products of combustion with respect to their chemical character, means for withdrawing gaseous products from said combustion chamber, for increasing the pressure of the withdrawn gaseous products and for delivering the withdrawn gaseous products under increased pressure into fuel within said conduit, and means for continuously discharging resulting fluid from said conduit.

In testimony whereof I have signed my name to this specification in the presence of two subscribing witnesses.

HENNING FRIEDRICH WALLMANN.

Witnesses:
Mrs. G. S. WALKER,
W. D. PENNINGTON.

Correction in Letters Patent No. 1,177,584.

It is hereby certified that in Letters Patent No. 1,177,584, granted March 28, 1916, upon the application of Henning Friedrich Wallmann, of Chicago, Illinois, for an improvement in "Apparatus for Generating Gas," an error appears in the printed specification requiring correction as follows: Page 11, claim 32, strike out line 72; and that the said Letters Patent should be read with this correction therein that the same may conform to the record of the case in the Patent Office.

Signed and sealed this 22d day of August, A. D., 1916.

[SEAL.]
F. W. H. CLAY,
*Acting Commissioner of Patents.*

Cl. 48—63.